United States Patent [19]
Ebner et al.

[11] Patent Number: 5,150,609
[45] Date of Patent: Sep. 29, 1992

[54] ON BOARD COMPUTER FOR A MOTOR VEHICLE

[75] Inventors: Roland Ebner, Eberdingen; Dieter Hannig, Weissach, both of Fed. Rep. of Germany

[73] Assignee: Dr. Ing. h.c.F. Porsche AG, Fed. Rep. of Germany

[21] Appl. No.: 572,236

[22] Filed: Aug. 24, 1990

[30] Foreign Application Priority Data

Aug. 24, 1989 [DE] Fed. Rep. of Germany ....... 3927921

[51] Int. Cl.⁵ .......................................... G01M 15/00
[52] U.S. Cl. ................................................. 73/117.3
[58] Field of Search .................... 73/116, 118.1, 117.2, 73/117.3, 119 A

[56] References Cited

U.S. PATENT DOCUMENTS

| | | | |
|---|---|---|---|
| 4,141,242 | 2/1979 | Scott | 73/119 A |
| 4,281,388 | 7/1981 | Friend et al. | |
| 4,748,843 | 6/1988 | Schafer et al. | 73/117.3 |
| 4,996,643 | 2/1991 | Sakamoto et al. | 73/117.2 |

FOREIGN PATENT DOCUMENTS

| | | |
|---|---|---|
| 0005436 | 3/1971 | European Pat. Off. |
| 0094090 | 1/1987 | European Pat. Off. |
| 0266704 | 10/1987 | European Pat. Off. |
| 2952500 | 7/1981 | Fed. Rep. of Germany |
| 3233833 | 3/1984 | Fed. Rep. of Germany |
| 3320774 | 12/1984 | Fed. Rep. of Germany |
| 3540599 | 5/1987 | Fed. Rep. of Germany |
| 3624456 | 1/1988 | Fed. Rep. of Germany |
| 8700492 | 3/1988 | PCT Int'l Appl. |

OTHER PUBLICATIONS

De-Buch-VDI-Berichte "Electronik" in Sep. 1988 pp. 314-388.
BMW-"Kombi-Instrument High and Low"; Chick Control BC IV pp. 1-58.
1 page-European Search Report, Instrumentierung und Informationssysteme in BMW-fahrzeugen.
Ins (grad) W. Weishaupt, A. Proske und M. Tisses, Munich pp. 329-349.

*Primary Examiner*—Robert Raevis
*Attorney, Agent, or Firm*—Evenson, Wands, Edwards, Lenahan & McKeown

[57] ABSTRACT

An on-board computer for a motor vehicle is equipped with a microprocessor which acquires input signals from analog or digital generators and derives display values or display data from them. These display values or display data are displayed on a display system assigned to the on-board computer which preferably is arranged within an instrument cluster of the dashboard of the motor vehicle. For the switching-over or for the free selection of a certain, particularly country-specific, set of programs or data or display values or display data, the on-board computer, which is also used as a diagnostic system for several control units installed into the motor vehicle, is switched to a diagnostic mode and the corresponding set of data is selected by means of the function switch of the on-board computer.

3 Claims, 2 Drawing Sheets

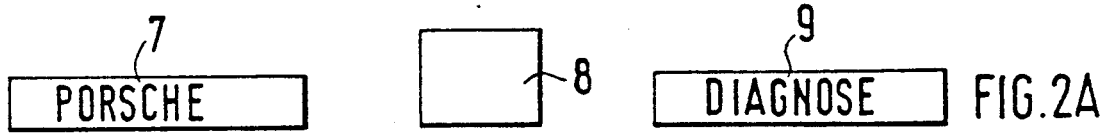
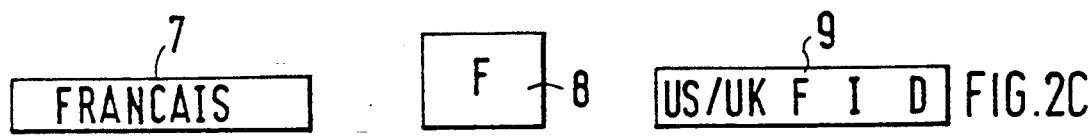
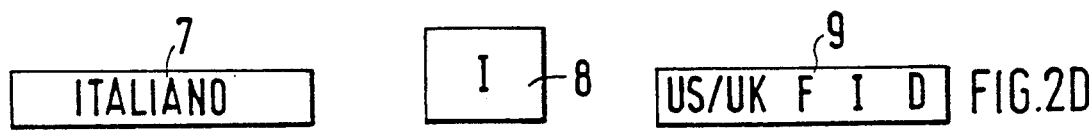
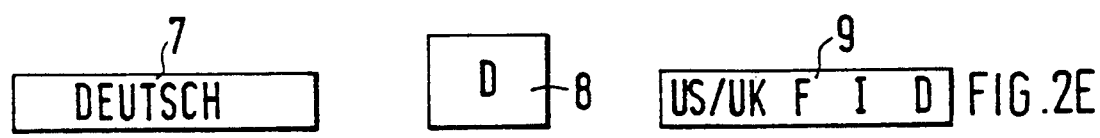

ON BOARD COMPUTER FOR A MOTOR VEHICLE

BACKGROUND AND SUMMARY OF INVENTION

The invention relates to an on-board computer for a motor vehicle according to the preamble of the main claim.

On-board computers for motor vehicles are frequently equipped with a microprocessor which acquires input signals from analog or digital generators and displays them on a display system. Frequently these include display texts or display values which must correspond to the language or the customary value dimensions of a country into which the motor vehicle is to be shipped. In this connection, it has become known, for example from the German Patent Document DE 32 33 833A1, to store several programs for processing the input signals in a program memory of the microprocessor. These arbitrarily selectable programs may be selected by way of an additional tip switch. An indicator which characterizes the selected program will then be displayed in the display system of the on-board computer.

Likewise, in *VDI-Berichte* 612 (VDI Reports 612) "Elektronik im Kraftfahrzeug" ("Electronics in the Motor Vehicle"), Conference/VDI Gesellschaft Fahrzeugtechnik (Society for Automotive Engineering) Düsseldorf: VDI-Verlag 1986, Baden-Baden, Oct. 9/10, 1986, on Pages 329 to 345, an information system for vehicles is described in which, where it is known during the production of the motor vehicle that the texts are to be displayed in the language of a specific country, a corresponding code is loaded into a nonvolatile storage area of the information system.

Thus, both systems result in a certain standardization of the information system for different destination countries of the motor vehicles. While in the former case, an additional switch is required for the change-over of the set of programs or data, the known information system does not require this type of a switch. However, the country-specific display is permanently established during the production and cannot be reprogrammed or can be reprogrammed only at very high expenditures at a later point in time, for example, when the vehicle is to be sold into a foreign country.

In the DE-35 40 599 A1 and in the *VDI-Berichte* (VDI-Reports) "Elektronik im Kraftfahrzeug" ("Electronics in the Motor Vehicle") Baden-Baden Conference, Sept. 8/9, 1988, Pages 315 to 338, an on-board computer is also described which has a display system that is arranged in an instrument cluster of a dashboard of a motor vehicle. The on-board computer is adapted to perform the function of a diagnostic system for several control units which are installed in the motor vehicle. For this purpose, the on-board computer is changed over to a diagnostic mode by means of a diagnostic connector. A function switch is used for the selection of the display functions in the on-board computer mode and for the accumulation control of the diagnostic analysis in the diagnostic mode.

It is an object of the present invention to provide an on-board computer for a motor vehicle by which a set of programs or data or display values or display data can be freely selected by simple means, without the requirement of using additional input elements at the on-board computer or having to reprogram the on-board computer.

This object is achieved by using the function switch of the on-board computer in place of a tip switch for the free selection of a specific (particularly country-specific) set of programs or data or display values or display data and by the fact that the selection takes place in a diagnostic mode of the on-board computer. The principal advantages of the invention are that a specific set of programs or data or display values or display data can be freely selected from a plurality of sets without additional input elements at the on-board computer or extensive reprogramming operations at the on-board computer.

Other objects, advantages and novel features of the present invention will become apparent from the following detailed description of the invention when considered in conjunction with the accompanying drawings.

BRIEF DESCRIPTION OF THE DRAWINGS

FIGS. 2A through 2E show characters which can be displayed on a display unit of the on-board computer as they appear during respective stages of the operating sequence of the invention.

DETAILED DESCRIPTION OF THE DRAWING

Figure 1:
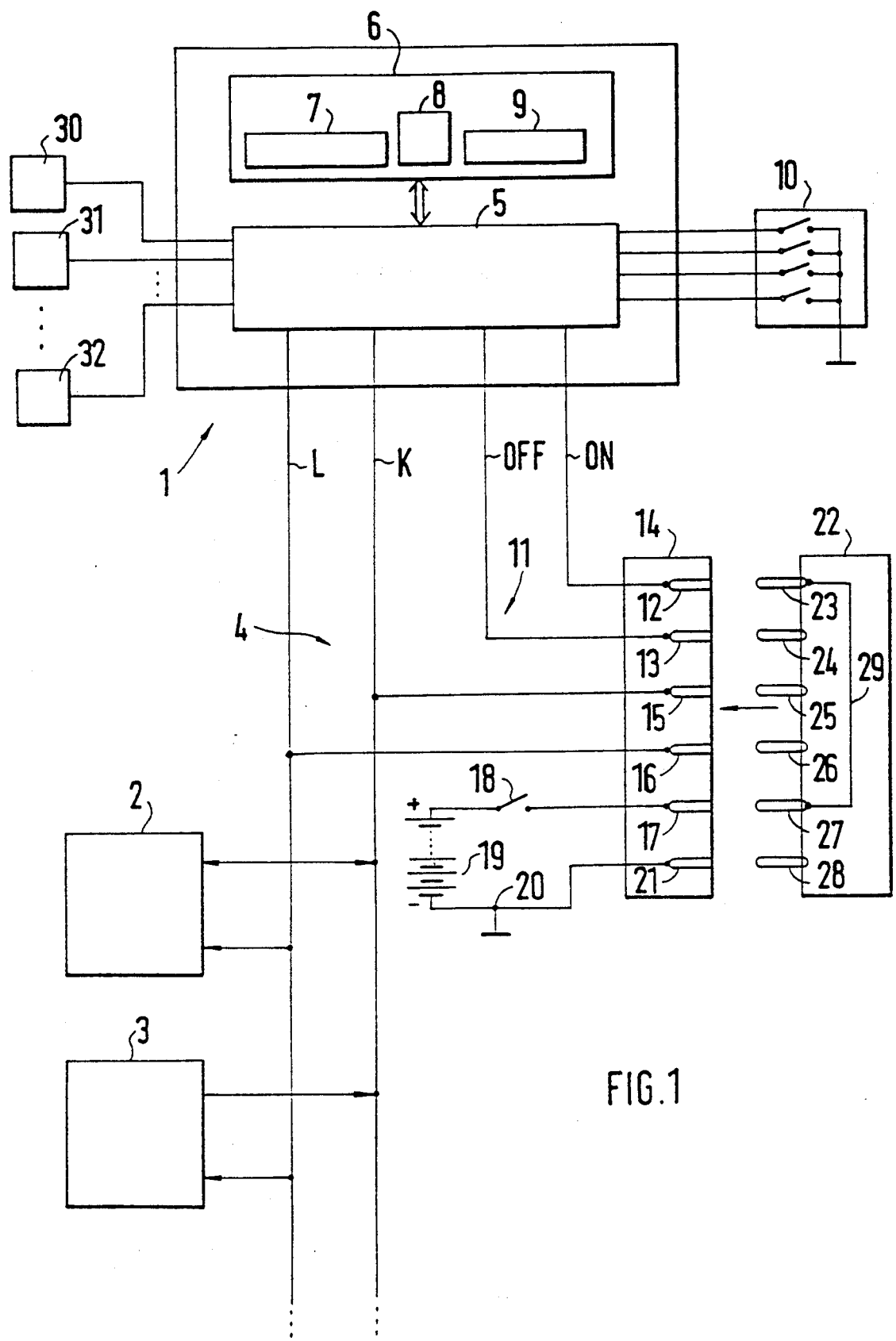
FIG. 1 is a view of an on-board computer within an instrument cluster of a vehicle having several control systems connected by way of a bus system and having a diagnostic connecting arrangement.

Reference number 1 of FIG. 1 shows an on-board computer for a motor vehicle, which functions as a diagnostic system for several control systems installed in the motor vehicle, such as for example, an electronic fuel injection system 2 and an antilock system 3. By way of a diagnostic bus 4, these systems are connected with a microprocessor 5 of the on-board computer 1 integrated within an instrument cluster.

A display system 6 of the on-board computer 1, in this case, is preferably situated in the driver's direct visual range. The display system 6 may have one or several display units 7, 8 and 9 on which symbols and/or alphanumeric characters can be represented. In this case, the display units 7, 8 and 9 are used, for example, for an electronic odometer system 7 and for multifunction displays (function display 8 and data display 9) of the on-board computer. Additionally, the display units may be used for the determination of driving data, in which case a display of a corresponding function and pertaining data outside the diagnostic mode can be preselected by a function switch 10 comprising several switching alternatives.

As described in the DE 35 40 599 or the *VDI-Berichte* 687 (VDI-Reports 687) "Elektronik im Kraftfahrzeug" ("Electronics in the Motor Vehicle") Conference/VDI Gesellschaft Fahrzeugtechnik (Society for Automotive Engineering) Düsseldorf: VDI-Verlag 1988, Baden-Baden, Sept. 8/9, 1988, Pages 315 to 338, the microprocessor 5 is connected with sockets 12 and 13 of a connector 14 by way of control lines 11. By means of this connector 14, the on-board computer 1, together with the microprocessor 5 and the display system 6, can be changed over to a diagnostic mode.

Two control lines 11 are provided, the first ON control line (socket 12) being used to change the diagnostic system to an on-board analysis, and the second OFF control line (socket 13) being used to change the diagnostic system to an off-board analysis (analysis by means of an external diagnostic system). The diagnostic bus 4 is also connected to sockets 15, 16 of the connector 14. Finally, another socket 17 is connected with a positive+pole of a battery 19 by way of an ignition switch 18, the negative−pole of the battery 19 being connected to a vehicle mass 20 and a socket 21 of the connector 14.

To initiate and carry out the on-board analysis, which is described in detail in the two above-described documents, a diagnostic connector 22 is inserted into the connector 14. The diagnostic connector 22 comprises contact pins 23 to 28 which enter into an electrically conductive connection with the corresponding sockets 12 to 13, 15 to 17 and 21. In the case of the on-board analysis, the diagnostic connector 22 has only a shorting bar 29 which bridges the contact pins 23 and 27. In the inserted condition, the diagnostic connector 22 therefore connects the ON control line with the + plus pole of the battery 19, if the ignition switch 18 is closed. This changes the instrument cluster to the diagnostic mode.

To select of a specific (particularly country-specific) set of programs or data or display values or display data in this diagnostic bus, the function switch 10 is used to cause the display functions of the on-board computer 1 to be selected in the on-board computer mode, and the sequence of the analysis is controlled in the diagnostic mode. This takes place as follows:

By continuous actuation of a switching alternative of the function switch 10 for a predetermined time period (for example, for 3 seconds), the selection of the set is now initiated. For this purpose, the switching alternative may, for example, be used which normally serves for initializing a selected control system or for triggering the error output.

By means of a short one-time or repeated reactuation of this switching alternative, the available sets of programs, or data or display values or display data may be sequentially preselected. When the desired set is preselected, it may then be selected by the pulling of the diagnostic connector 22 or by opening the ignition switch 18, and may be stored.

Input signals of analog or digital generators 30 to 32, which detect for example operating or driving data of the motor vehicle, may also be fed to the on-board computer 1 for presentation on display 6.

FIG. 2 shows several display texts appearing in displays 7, 8 and 9. FIG. 2a shows the display system after connection of the diagnostic connector 22 to the connector 14; the line of characters (Porsche Analysis) will appear. After continuous actuation of the switching alternative of the function switch 10 for a predetermined time period (for example, for 3 seconds), the selected language of the specific country (for example, English) appears in display unit 7; the nationality symbol (UK, US) of the preselected set of characters will appear in display unit 8; and the nationality symbols of the selectable sets of characters will appear in display unit 9.

The additional FIGS. 2c, 2d, and 2e show the displays which may be sequentially preselected by short one-time or repeated reactuation of the switching alternative.

According to the invention, therefore, country-specific sets of programs, data or display values or display data may be selected, without any additional input media at any time by authorized persons. For example, selection may be made in a service shop by changing the on-board computer of the vehicle into a diagnostic mode by the connecting of the diagnostic connector. If the country-specific sets also comprise the text outputs in the diagnostic mode, it becomes possible for service personnel in a repair or service shop in a foreign country, for example, to change the output language (at least for the duration of the stay in the repair shop) to their native language or to a language which they understand.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An on-board computer arrangement for a motor vehicle comprising:

signal generators providing input signals which are at least one of: analog signals and digital signals;

a microprocessor coupled to receive said input signals and having stored in a memory thereof a plurality of sets of information which comprise at least one of: programs and data for varying processing of said input signals and display of output information derived from said input signals, a desired set from among said programs and data being freely selectable from said sets of information;

a display system arranged in an instrument cluster within a dashboard of said motor vehicle and coupled to receive and display said output information from said microprocessor;

a diagnostic system for a plurality of control systems installed in said motor vehicle, said control systems having a self monitoring function and nonvolatile storage devices for storing error reports concerning said control systems;

a connecting arrangement coupled to said on-board computer;

diagnostic connector means connectable to said connecting arrangement, for switching said on-board computer arrangement from a computer mode to a diagnostic mode for reading said error reports from said nonvolatile storage devices; and function switch means for selecting at least display functions of said on-board computer in the computer mode, and for controlling a diagnostic sequence in the diagnostic mode, said function switch means being operable in said diagnostic mode for selecting desired specific sets from said sets of programs and data and output information, said selection being initiated through the diagnostic connector connected to the connecting arrangement, by continuous actuation of a switching alternative of said function switch means for a predetermined time period;

wherein said function switch means is operable for preselecting sequentially a desired set from among said programs, data and output information, in response to at least one short actuation of a switching alternative thereof; and wherein said microprocessor is adapted to select a preselected set from among said programs, data and output information, in response to removal of the diagnostic connector from the connecting arrangement.

2. An on-board computer arrangement according to claim 1, wherein the preselected set is obtained by means of the display of at least one of a country specific native language in plain test and a nationality symbol in the display system.

3. An on-board computer arrangement for a motor vehicle comprising:

signal generators providing input signals which are at least one of: analog signals and digital signals;

a microprocessor coupled to receive said input signals and having stored in a memory thereof a plurality of sets of information which comprise at least one of: programs and data for varying processing of said input signals and display of output information derived from said input signals, a desired set from among said programs and data being freely selectable from said sets of information;

a display system arranged in an instrument cluster within a dashboard of said motor vehicle and coupled to receive and display said output information from said microprocessor;

a diagnostic system for a plurality of control systems installed in said motor vehicle, said control systems having a self monitoring function and nonvolatile storage devices for storing error reports concerning said control systems;

a connecting arrangement coupled to said on-board computer;

diagnostic connector means connectable to said connecting arrangement, for switching said on-board computer arrangement from a computer mode to a diagnostic mode for reading said error reports from said nonvolatile storage devices; and function switch means for selecting at least display functions of said on-board computer in the computer mode, and for controlling a diagnostic sequence in the diagnostic mode, said function switch means being operable in said diagnostic mode for selecting desired specific sets from said sets of programs and data and output information, said selection being initiated through the diagnostic connector connected to the connecting arrangement, by continuous actuation of a switching alternative of said function switch means for a predetermined time period;

wherein said function switch means is operable for preselecting sequentially a desired set from among said programs, data and output information, in response to repeated actuation of a switching alternative thereof.

* * * * *